US007493433B2

(12) United States Patent
Behrendt et al.

(10) Patent No.: US 7,493,433 B2
(45) Date of Patent: Feb. 17, 2009

(54) SYSTEM, METHOD AND STORAGE MEDIUM FOR PROVIDING AN INTER-INTEGRATED CIRCUIT (I2C) SLAVE WITH READ/WRITE ACCESS TO RANDOM ACCESS MEMORY

(75) Inventors: Eileen M. Behrendt, Mahopec, NY (US); Jeffrey R. Biamonte, Hyde Park, NY (US); Raymond J. Harrington, Staatsburg, NY (US); Timothy M. Trifilo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 10/977,758

(22) Filed: Oct. 29, 2004

(65) Prior Publication Data

US 2006/0095670 A1 May 4, 2006

(51) Int. Cl.
*G06F 13/00* (2006.01)
*G06F 13/42* (2006.01)
*G06F 13/14* (2006.01)
(52) U.S. Cl. ...................... 710/110; 710/105
(58) Field of Classification Search ................. 710/105, 710/110
See application file for complete search history.

(56) References Cited

U.S. PATENT DOCUMENTS

| | | | |
|---|---|---|---|
| 5,874,931 A | 2/1999 | Drake et al. | 345/51 |
| 6,545,935 B1 | 4/2003 | Hsu et al. | 365/230.05 |
| 6,779,046 B1 * | 8/2004 | Osuga | 710/14 |
| 7,038,929 B2 * | 5/2006 | Kang | 365/145 |
| 7,231,467 B2 * | 6/2007 | Baker et al. | 710/9 |

(Continued)

FOREIGN PATENT DOCUMENTS

| | | |
|---|---|---|
| EP | 0855654 B1 | 7/1998 |
| JP | 2000165421 A1 | 6/2000 |

OTHER PUBLICATIONS

Tanenbaum, Andrew S.; "Structured Computer Organization"; Prentice-Hall, Inc.; 1990; Third Edition; pp. 11-13.*

(Continued)

*Primary Examiner*—Paul R Myers
*Assistant Examiner*—Ryan M Stiglic
(74) *Attorney, Agent, or Firm*—Cantor Colburn LLP; Geraldine Monteleone

(57) ABSTRACT

A method for data access via an inter-integrated circuit (I2C) protocol. The method includes receiving an I2C read command at an I2C slave device, where the I2C read command is from an I2C master device. The method also includes reading stored data from a storage device in response to receiving an I2C read command. The stored data is at a first location in the storage device corresponding to a value in a register array pointer in the I2C slave device. The stored data is transmitted to the I2C master device in response to the reading. The method also includes receiving an I2C write command at the I2C slave device, where the I2C write command is from the I2C master device and the write command includes master data and a slave device register address. The master data is written to the storage device in response to receiving the I2C write command, with the master data being written at a second location in the storage device corresponding to the slave device register address.

6 Claims, 2 Drawing Sheets

U.S. PATENT DOCUMENTS

2003/0162562 A1* 8/2003 Curtiss et al. ............... 455/556
2004/0225812 A1* 11/2004 Ervin ......................... 710/305
2005/0108454 A1* 5/2005 Baker et al. ................. 710/110
2005/0114463 A1* 5/2005 Lee ............................ 709/208

OTHER PUBLICATIONS

Phillips Semiconductor; "The I2C-Bus Specification"; Phillips Semiconductor; Jan. 2000; Version 2.1; all pages.*

* cited by examiner

SYSTEM, METHOD AND STORAGE MEDIUM FOR PROVIDING AN INTER-INTEGRATED CIRCUIT (I2C) SLAVE WITH READ/WRITE ACCESS TO RANDOM ACCESS MEMORY

BACKGROUND OF THE INVENTION

The invention relates to an inter-integrated circuit (I2C) slave device and, in particular, to providing the I2C slave device with read/write access to a random access memory (RAM) device.

I2C is a serial computer bus protocol that is typically utilized to connect integrated circuits (e.g., peripherals) in an embedded system or motherboard through the use of two bi-directional pins (clock and data). I2C is a multi-master bus that allows multiple integrated circuits to be connected to the same bus with each one having the ability to act as the I2C master device by initiating a data transfer. I2C slave devices are utilized in programmable logic devices (PLDs) for many applications such as I2C multiplexing and I2C based microprocessor control.

An I2C slave device contains registers than can be written to and read from by an I2C master device. When an I2C slave device is implemented in a PLD (e.g., a field programmable gate array "FPGA" and a complex programming logic device "CPLD"), each bit of an eight bit register consumes one logic element (e.g., in a FPGA) or one macrocell (e.g., in a CPLD) within the PLD. For example, a two hundred and fifty six register I2C slave would consume two thousand and forty eight logic elements (or macrocells), or about one third of the logic elements in a typical six thousand logic element device. The fewer logic elements consumed, the better, as the cost of a digital logic design is often measured as the ratio of the number of logic elements consumed per dollar cost of the device. As the required logic count of a design increases, the costs associated with the device will rise accordingly.

BRIEF SUMMARY OF THE INVENTION

Exemplary embodiments of the present invention include a method for data access via an inter-integrated circuit (I2C) protocol. The method includes receiving an I2C read command at an I2C slave device, where the I2C read command is from an I2C master device. The method also includes reading stored data from a storage device in response to receiving an I2C read command. The stored data is at a first location in the storage device corresponding to a value in a register array pointer in the I2C slave device. The stored data is transmitted to the I2C master device in response to the reading. The method also includes receiving an I2C write command at the I2C slave device, where the I2C write command is from the I2C master device and the write command includes master data and a slave device register address. The master data is written to the storage device in response to receiving the I2C write command, with the master data being written at a second location in the storage device corresponding to the slave device register address.

Further exemplary embodiments include a storage medium for data access via an I2C protocol. The storage medium is encoded with machine readable computer program code for causing a computer to implement a method. The method includes receiving an I2C read command at an I2C slave device, where the I2C read command is from an I2C master device. The method also includes reading stored data from a storage device in response to receiving an I2C read command. The stored data is at a first location in the storage device corresponding to a value in a register array pointer in the I2C slave device. The stored data is transmitted to the I2C master device in response to the reading. The method also includes receiving an I2C write command at the I2C slave device, where the I2C write command is from the I2C master device and the write command includes master data and a slave device register address. The master data is written to the storage device in response to receiving the I2C write command, with the master data being written at a second location in the storage device corresponding to the slave device register address.

Additional exemplary embodiments include an I2C slave device with a register array pointer, a serial data port, a serial clock port, a plurality of storage device ports and a microprocessor. The register array pointer contains a current register location value. The serial data port and serial clock port are adapted for receiving commands from an I2C master device. The storage device ports are adapted for communicating with a storage device. The microprocessor includes instructions to implement a method. The method includes receiving an I2C read command at the I2C slave device via the serial data port and the serial clock port. The stored data is read from the storage device via the storage device ports in response to receiving the I2C read command. The stored data is at a first location in the storage device corresponding to a value in the register array pointer. The stored data is transmitted to the I2C master device via the serial data port in response to the reading. The method also includes receiving an I2C write command at the I2C slave device via the serial data port and the serial clock port. The write command is from the I2C master device and the write command includes master data and a slave device register address. The master data is written to the storage device via the storage device ports in response to receiving the I2C write command, where the master data is written at a second location in the storage device corresponding to the slave device register address.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Exemplary embodiments of the present invention include an I2C slave being implemented with a programmable device. In a standard I2C implementation, the I2C slave device contains eight bit registers that allow for an I2C master device to read data from and write data to the I2C slave device. Exemplary embodiments of the present invention replace the standard I2C register implementation with a RAM device implementation. The I2C slave state machine, or logic, has been altered such that when the I2C master attempts to access the registers in the I2C slave device, the data being accessed is actually stored in a low cost RAM array (internal to the FPGA or CPLD). By using the RAM array for storage instead of the registers on the I2C slave device, costly logic element resources may be saved. The I2C master device interaction with the RAM is no different than the traditional register access and therefore, this implementation is transparent to the user. Therefore, logic in the I2C master device does not have to be changed in order to utilize exemplary embodiments of the present invention.

In a traditional I2C slave device, discrete registers are implemented using latch circuits to create "storage cells." This may be efficient when there is no microprocessor present, but becomes less efficient in systems where accessible RAM exists. In an exemplary embodiment of the present invention, a microprocessor with memory is receptive to signals from an I2C slave device and is largely considered to be an extension of such I2C slave. It is more efficient to utilize the RAM rather than to utilize countless banks of logic elements for register storage.

Figure 1:
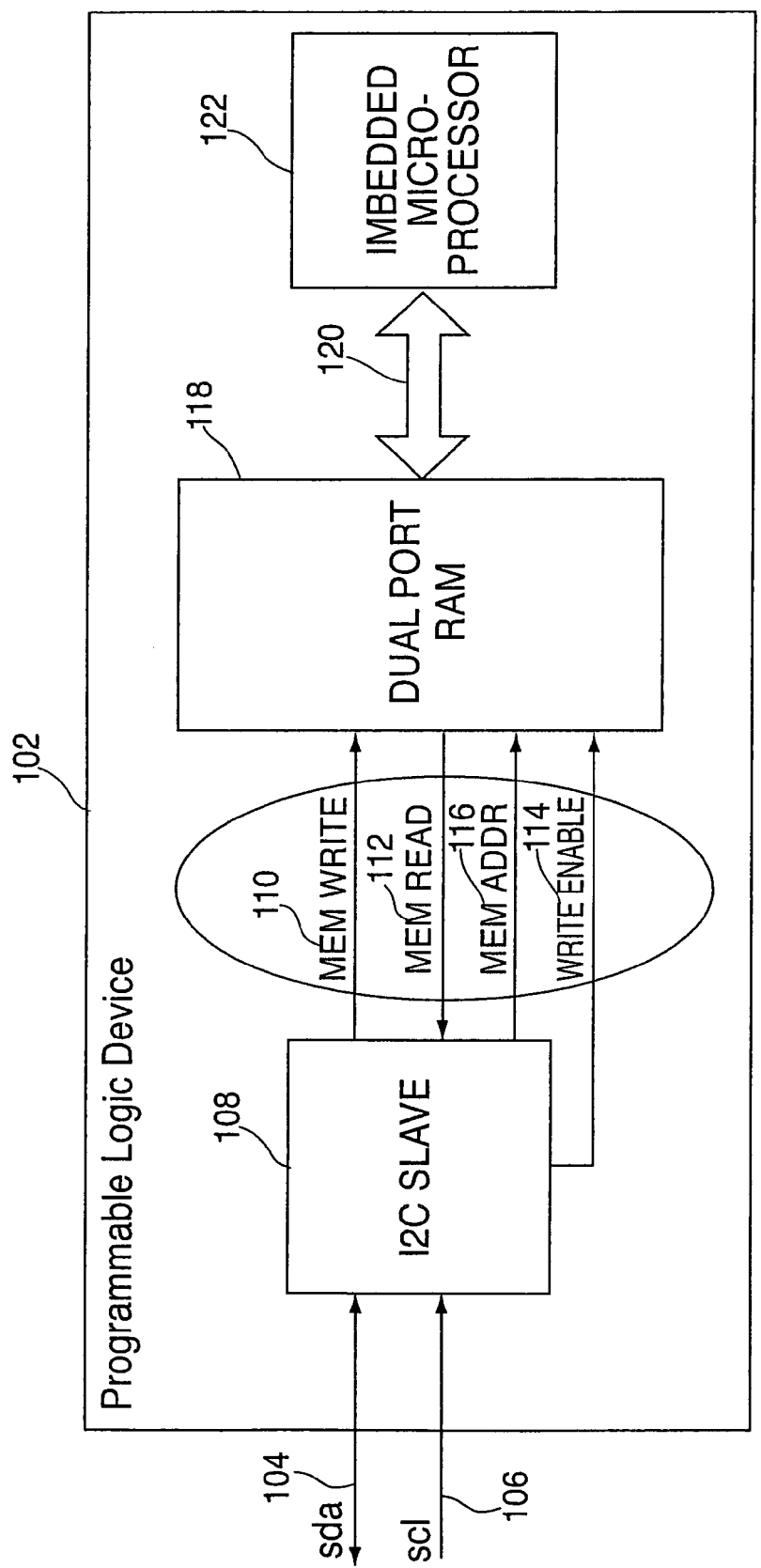
FIG. 1 depicts a block diagram of a system that may be utilized by exemplary embodiments of the present invention.

FIG. 1 depicts a block diagram of a system that may be utilized by exemplary embodiments of the present invention. A programmable logic device (PLD) 102 (e.g., FPGA and CPLD) includes an I2C slave device 108, a volatile or non-volatile RAM device 118 and an imbedded microprocessor 122. Inputs to the I2C slave device 108 include the serial data line 104 and the serial clock line 106. The I2C slave device 108 on a PLD 102 with a serial data line 104 and a serial clock line 106 are the components typically utilized by an I2C master device communicating with an I2C slave device 108 located on a PLD 102 to read and/or to write data to the I2C slave device 108.

Also included in FIG. 1 is a memory write signal 110, a memory read signal 112, a memory address signal 116, and a write enable signal 114 all communicating between the I2C slave device 108 and the RAM device 118. The memory write signal 110, memory read signal 112, memory address signal 116 and write enable signal 114 provide access to the RAM device 118 from the I2C slave device 108.

A standard I2C state machine is typically monitoring the serial data line 104 looking for the level of a read/write bit. The read/write bit may be positioned as the eighth bit in an eight bit data transfer where the first seven bits specify a slave device address. When the read/write bit is set to read, the state machine jumps to its read state and sends the data stored in a register to the I2C master device. When the read/write bit is set to write, the state machine jumps to its write state and allows the I2C master device to store eight bit data into a register on the I2C slave device 108. In exemplary embodiments of the present invention, the read and write states have been altered to allow interaction with a RAM device 118. The write state now pulses the write enable signal 114 to trigger a write sequence to the RAM device 118. The read state sets the memory address and reads data from the RAM device 118.

The RAM device 118 may be implemented by any kind of RAM device 118 with one or more ports. The RAM device 118 depicted in FIG. 1 is a dual port RAM device 118 with a further communication link 120 to an imbedded microprocessor 122. The imbedded microprocessor 122 can also read data from and write data to the RAM device 118 via the communication link 120. In this manner, the imbedded microprocessor 122 may update the data being read by the I2C slave device 108. In addition, the microprocessor 122 may read the data being stored by the RAM device 118 for the I2C slave device 108 and take other actions based on the values of this data.

Alternate exemplary embodiments include having the RAM device 118 located externally to the PLD 102. Other alternate exemplary embodiments do not include the imbedded microprocessor 122 depicted in FIG. 1, or alternatively, they include the embedded microprocessor 122 being located externally to the PLD 102. The RAM device 118 and the PLD 102 may share a power source, or have separate power sources. The previous configurations are intended to be exemplary in nature, and any configuration that utilizes a RAM device 118 to store I2C slave device 108 data without changing the I2C master device interface may be implemented by exemplary embodiments of the present invention.

Figure 2:
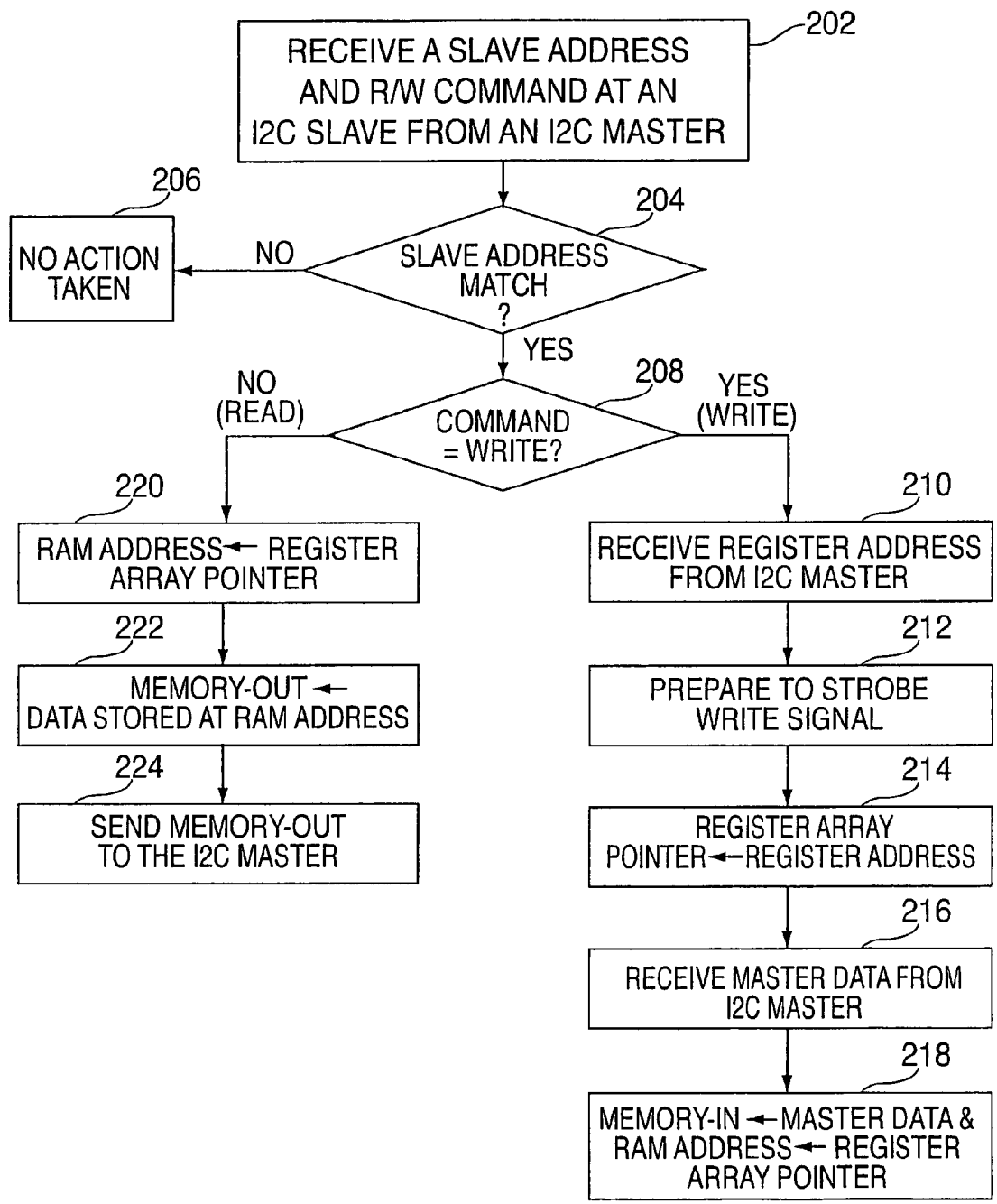
FIG. 2 depicts a process flow that may be implemented by exemplary embodiments of the present invention.

FIG. 2 depicts a process flow that may be implemented by exemplary embodiments of the present invention. At step 202, a slave address and read/write command from an I2C master device is received at an I2C slave device 108. Typically, the I2C master device sends eight bits to the I2C slave device 108, with the first seven bits representing the slave device address and the last bit including the read/write command bit. The read/write command bit is a "1" to indicate a read command and a "0" to indicate a write command. At step 204, a check is made by the I2C slave device 108 to determine if the slave address corresponds to the I2C slave device 108. If it does not correspond, then step 206 is performed and no action is taken because the read/write command does not pertain to the slave device 108 receiving the slave address and read/write command. If it is determined, at step 204, that the slave address corresponds to the I2C slave device 108, then the slave acknowledges the address by a single pulse low of the SDA line, such that the next bitstream may be sent and step 208 is performed to determine the value of the read/write command.

If it is determined, at step 208, that the read/write command bit is equal to a "1", then step 220 is performed to read data from the RAM device 118 via the I2C slave device 108. Steps 202 through 208 are the same steps that would be performed using a standard I2C protocol for reading data from a register in an I2C slave device 108. In a standard I2C protocol, the I2C slave device 108 would then return the data in the register currently being pointed to by a register array pointer (in the I2C slave device 108) to the I2C master device. Because exemplary embodiments of the present invention utilize a RAM device 118 instead of registers within the I2C slave device 108, steps 220 through 224 are performed to return data from the RAM device 118 to the I2C master device. At step 220, the RAM address is set to the value of the register array pointer in the I2C slave device 108. The RAM address is then sent to the RAM device via the memory address signal 116. At step 222, the data located at the RAM address is transmitted to the I2C slave device 108 via the memory read signal 112. The data from the memory read signal 112 is input to the memory-out value on the I2C slave device 108 and, at step 224, sent to the I2C master device via the serial data line 104. Thus, data from the RAM device 118 is sent to the I2C master device in response to a read request from the I2C master device in a manner that is transparent to the I2C master device. When step 224 has been performed, the read is complete.

Alternatively, if it is determined, at step 208, that the read/write command bit is equal to a "0", then step 210 is performed to write data to the RAM device 118 in communication with the I2C slave device 108. At step 210, the register address is received from the I2C master and the I2C slave device 108 acknowledges the register address. Steps 202 through 210 are the same steps that would be performed using a standard I2C protocol for writing data from an I2C master device to a register in an I2C slave device 108. Because exemplary embodiments of the present invention utilize a RAM device 118 for storing data instead of registers within the I2C slave device 108, an additional step, step 212 is performed. At step 212, the I2C slave device 108 prepares to strobe the write enable signal 114 to write to the RAM device 118. At step 214, the I2C slave device 108 stores the register address received from the I2C master device into the register array pointer. At step 216, data is received from the I2C master device and the I2C slave device 108 acknowledges the data.

Steps 214 and 216 are the same steps that would be performed using a standard I2C protocol for writing data from an I2C master device to a register in an I2C slave device 108. In a standard I2C protocol, the I2C slave device 108 would then write the data to the register in the I2C slave device 108 currently being pointed to by the register array pointer. Because exemplary embodiments of the present invention utilize a RAM device 118 instead of registers within the I2C slave device 108, step 218 is performed to write the data from the I2C master device to the RAM device 118. At step 218, memory in is set to the value of the data received from the I2C master device and transmitted to the RAM device 118 via the memory write signal 110. In addition, the RAM address is set to the value of the register array pointer in the I2C slave device 108 and transmitted to the RAM device 118 via the memory address signal 116. The write enable signal 114 is strobed to write the data to the RAM device 118. Thus, data from the I2C master device is stored in the RAM device 118 in response to a write request from the I2C master device in a manner that is transparent to the I2C master device. When step 218 has been performed, the write is complete.

This invention is generically applicable to systems employing the i2c bus standard where said i2c logic resides in a FPGA, ASIC, or CPLD. Applications may include but are not limited to automotive uses such as instrumentation, personal entertainment devices such as video games, and medical instrumentation Our use of this invention is a highly silicon area and/or logic element efficient implementation of I2C register space operative to make information available to a variety of i2c devices in an enterprise computing platform Exemplary embodiments of the present invention may be utilized to provide an interface to RAM via an I2C slave device in a manner that is transparent to an I2C master device. In this manner, RAM may be easily attached to the I2C slave device because the only logic change required is to the particular I2C slave device and not to the I2C master device. The use of RAM for I2C slave device allows logic elements within a PLD to be freed up for other uses. In addition, a RAM may be non-volatile and therefore, data that would be lost in the event of an power outage if kept in registers in the I2C slave device, may still be available if kept in a non-volatile RAM.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for data access via an inter-integrated circuit (I2C) protocol, the method comprising:
   receiving an I2C read command at an I2C slave device from an I2C master device, the I2C read command being intended to read from an internal memory of the I2C slave device;
   in response to receiving the I2C read command to read from the internal memory of the I2C slave device, altering the I2C read command at the I2C slave device such that the I2C read command causes stored data to be read from a storage device, being external to the I2C slave device, in place of reading from the internal memory of the I2C slave device;
   wherein:
      the stored data is at a first location in the storage device corresponding to a value in a register array pointer in the I2C slave device;
      the storage device is a random access memory (RAM) device;
      the I2C slave device, the storage device, and an imbedded microprocessor are located on a programmable logic device (PLD); and
      the storage device and the imbedded microprocessor are separate components than the I2C slave device;
   receiving an I2C write command at the I2C slave device from the I2C master device, the I2C write command being intended to write to the internal memory of the I2C slave device;
   wherein the I2C write command includes master data and a slave device register address; and
   in response to receiving the I2C write command to write to the internal memory of the I2C slave device, altering the I2C write command at the I2C slave device such that the I2C write command causes the master data to write to the storage device, being external to the I2C slave device, in place of writing to the internal memory of the I2C slave device.

2. The method of claim 1 further providing a volatile storage device.

3. The method of claim 1 further providing a non-volatile storage device.

4. The method of claim 1 wherein communication between the I2C slave device and the I2C master device is performed via a serial data line and a serial clock line.

5. The method of claim 1 wherein the communication between the I2C slave device and the storage device is performed via a memory write signal, a memory read signal, a write enable strobe and a memory address signal.

6. The method of claim 1 the storage device includes multiple storage device ports, the I2C slave device communicates with the storage device via a first storage device port, and the imbedded microprocessor communicates with the storage device via a second storage device port.

* * * * *